(12) United States Patent
Eto et al.

(10) Patent No.: US 10,247,165 B2
(45) Date of Patent: Apr. 2, 2019

(54) HANDHELD ENGINE-DRIVEN WORKING MACHINE

(71) Applicant: YAMABIKO CORPORATION, Ohme-shi, Tokyo (JP)

(72) Inventors: Kuniyoshi Eto, Ohme (JP); Toshiharu Sawada, Ohme (JP)

(73) Assignee: YAMABIKO CORPORATION, Ohme-Shi, Tokyo (JP)

( * ) Notice: Subject to any disclaimer, the term of this patent is extended or adjusted under 35 U.S.C. 154(b) by 0 days.

(21) Appl. No.: 15/485,426

(22) Filed: Apr. 12, 2017

(65) Prior Publication Data

US 2017/0292490 A1   Oct. 12, 2017

(30) Foreign Application Priority Data

Apr. 12, 2016   (JP) ................ 2016-079686

(51) Int. Cl.

| F02P 1/08 | (2006.01) |
| F02P 5/04 | (2006.01) |
| F02B 63/02 | (2006.01) |
| F02D 41/00 | (2006.01) |
| F02P 5/15 | (2006.01) |

(52) U.S. Cl.
CPC ............... *F02P 5/04* (2013.01); *F02B 63/02* (2013.01); *F02D 41/0097* (2013.01); *F02P 5/15* (2013.01); *F02P 5/1502* (2013.01); *F02D 2200/0404* (2013.01); *F02D 2200/101* (2013.01); *F02D 2200/1012* (2013.01); *F02D 2400/06* (2013.01); *F02P 1/08* (2013.01); *Y02T 10/46* (2013.01)

(58) Field of Classification Search
CPC ......... F02P 5/04; F02B 63/02; F02D 41/0097; F02D 2200/101
USPC .................................................. 123/406.24
See application file for complete search history.

(56) References Cited

U.S. PATENT DOCUMENTS

| 7,699,039 B2 * | 4/2010 | Carlsson ................. F02P 9/005 123/334 |
| 9,873,193 B2 * | 1/2018 | Gorenflo ................... B25F 5/00 |
| 2004/0134078 A1 | 7/2004 | Pfaltzgraff |
| 2005/0262705 A1 | 12/2005 | Pfaltzgraff |
| 2010/0064530 A1 | 3/2010 | Pfaltzgraff |
| 2013/0096743 A1 * | 4/2013 | Kado ...................... F02D 17/02 701/21 |
| 2014/0336910 A1 * | 11/2014 | Gibson ................... F02N 11/08 701/113 |

(Continued)

FOREIGN PATENT DOCUMENTS

JP   2007-209356 A   8/2007

*Primary Examiner* — Joseph J Dallo
*Assistant Examiner* — Yi-Kai Wang
(74) *Attorney, Agent, or Firm* — Baker & Hostetler LLP

(57) ABSTRACT

A handheld engine-driven working machine comprises an internal combustion engine with a throttle valve, a throttle adjusting device for adjusting an opening degree of the throttle valve of the internal combustion engine, and a control device provided in the internal combustion engine. The control device is configured to detect a rotational speed and an amount of change in the rotational speed at every at least one rotation of the internal combustion engine. The control device determines that the throttle valve is partially opened when the amount of change in the rotational speed is greater than a predetermined value.

5 Claims, 6 Drawing Sheets

(56) References Cited

U.S. PATENT DOCUMENTS

| | | | | |
|---|---|---|---|---|
| 2015/0184595 A1* | 7/2015 | Honzawa | ............... | F02B 63/02 123/41.58 |
| 2018/0010531 A1* | 1/2018 | Axelsson | ............... | F02D 37/02 |

* cited by examiner

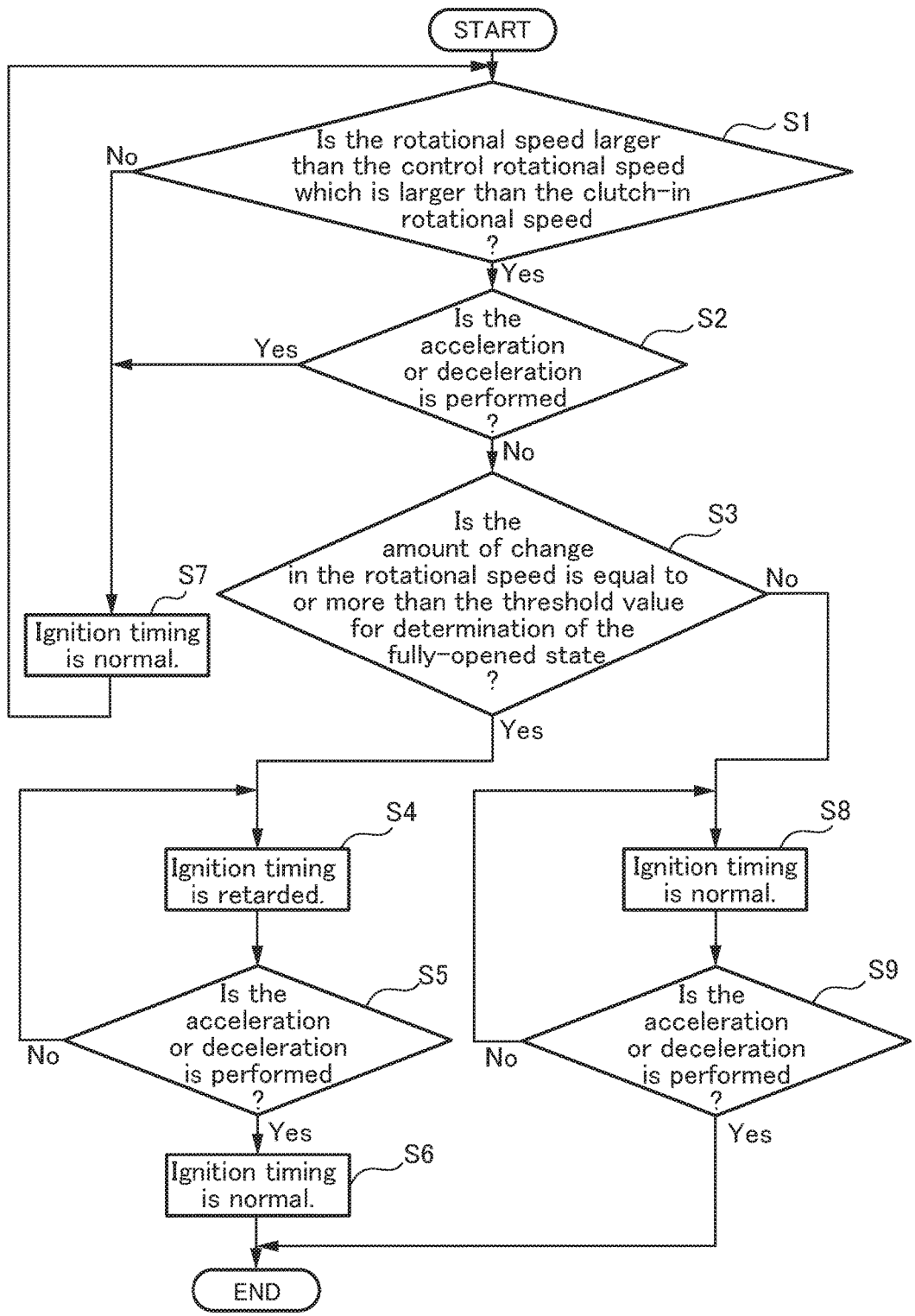

HANDHELD ENGINE-DRIVEN WORKING MACHINE

FIELD OF THE INVENTION

The present invention relates to a handheld engine-driven working machine, specifically, to a handheld engine-driven working machine, such as a brush cutter, a chain saw, a hedge trimmer and so on.

BACKGROUND OF THE INVENTION

An operator of the handheld engine-driven working machine may determine an opening degree of a throttle valve by listening to a sound of an internal combustion engine so that the internal combustion engine is operated at an appropriate rotational speed. As such, the throttle valve may be fully opened or not fully (namely, partially) opened.

In such an engine-driven working machine, when the throttle valve is partially opened, it is difficult to stabilize the combustion due to a poor amount of air or fuel supplied to the engine so that the vibration of the engine-driven working machine is likely to become larger than that when the throttle valve is fully opened. If whether the throttle valve is partially or fully opened can be determined, the vibration due to the partially-opened throttle valve could be addressed.

PRIOR ART PUBLICATION

Patent Publication 1: Japanese Patent Laid-open Publication No. 2007-209356

If a sensor is provided for directly detecting the opening degree of the throttle valve, whether the throttle valve is partially or fully opened could be determined. However, the handheld engine-driven working machine is required to be compact and light, and providing such a sensor is costly. Thus, it is preferably that whether the throttle valve is partially or fully opened can be determined without providing any sensor.

Further, if a rotational speed of the internal combustion engine is constant, it would be easy to determine whether or not the throttle valve is partially or fully opened by detecting the rotational speed of the internal combustion engine. However, the rotational speed when the throttle valve is fully opened varies depending on an amount of a load attached to an operating part. For example, the rotational speed when the throttle valve is fully opened varies between a case when a metallic cutter element (so called a chip saw) is attached to the operating part and a case when a nylon cord is attached to the operating part. Further, when a cutting element of nylon cord is attached to the operating part, a length of the nylon cord may vary so that the rotational speed when the throttle valve is fully opened may vary according to the length of the nylon cord. For example, when the metallic cutter element is attached to the operating part, the rotational speed would excess 10,000 rpm, while when the nylon cord is long, the rotational speed would be 6,000 rpm and when the nylon cord is short, the rotational speed would be 8,000 rpm. As a result, it may be impossible to determine whether the throttle valve is partially or fully opened by detecting the rotational speed.

Thus, the object of the present invention is to provide a handheld engine-driven working machine which can determine whether the throttle valve is partially or fully opened without any sensors directly detecting the opening degree of the throttle valve.

SUMMARY OF THE INVENTION

In order to achieve the above-stated object, a handheld engine-driven working machine according to the present invention comprises an internal combustion engine with a throttle valve; a throttle adjusting device for adjusting an opening degree of the throttle valve of the internal combustion engine; and a control device provided in the internal combustion engine; wherein the control device is configured to detect a rotational speed and an amount of change in the rotational speed at every at least one rotation of the internal combustion engine, and determines that the throttle valve is partially opened when the amount of change in the rotational speed is greater than a predetermined value.

In this engine-driven working machine, whether the throttle valve of the internal combustion engine is partially or fully opened can be determined by comparing the amount of change in the rotational speed with the predetermined value. Thus, whether the throttle valve is partially or fully opened can be determined without using any sensors for detecting the opening degree of the throttle valve.

In the above-stated handheld engine-driven working machine, the amount of change in the rotational speed may be a rate of rotational speed variation, a maximum value of a difference between the rotational speeds at two successive rotations during a predetermined number of successive rotations, a difference between a maximum value and a minimum value of the rotational speed at every rotation during a predetermined number of successive rotations, or an accumulated amount of differences between the rotational speeds at two successive rotations during a predetermined number of successive rotation.

In the above-stated handheld engine-driven working machine, preferably, the predetermined value may be different depending on a rotational speed zone or may become large as the rotational speed becomes large.

In the above-stated handheld engine-driven working machine, preferably, the control device retards an ignition timing of the internal combustion engine after the control device determines that the throttle valve is partially opened.

The handheld engine-driven working machine according to the present invention can determine whether the throttle valve is partially or fully opened without using any sensors for directly detecting the opening degree of the throttle valve.

BRIEF DESCRIPTION OF THE DRAWINGS

FIG. 6 is a flowchart showing an example of an operation of the brush cutter according to the present invention.

DETAILED DESCRIPTION OF EMBODIMENTS

Figure 1:
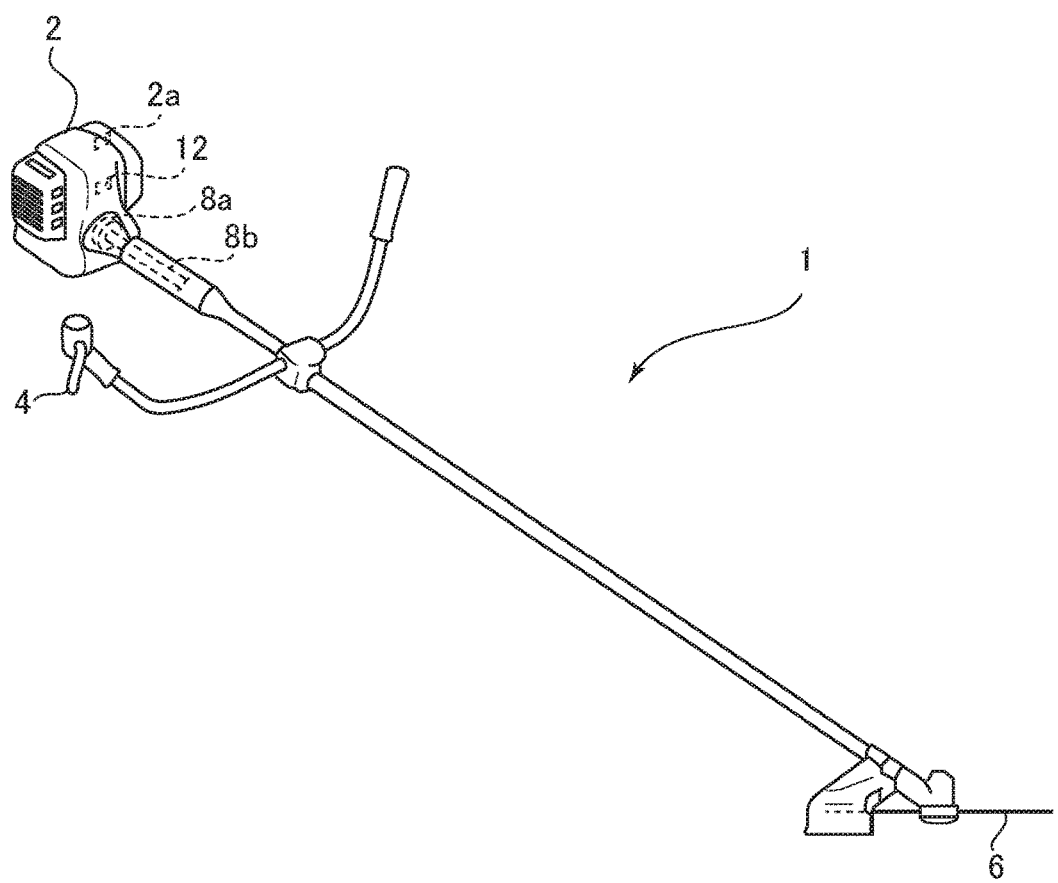
FIG. 1 is a perspective view of a brush cutter according to the present invention.

Now, referring to the drawings, a brush cutter which is an embodiment of a handheld engine-driven working machine according to the present invention will be explained. As shown in FIG. 1, a brush cutter 1 according to the present invention has an internal combustion engine 2 with a throttle valve 2a, a throttle lever 4 adjusting an opening degree of the throttle valve 2a of the internal combustion engine 2, a control device 12 provided in the internal combustion engine 2 (see FIG. 2), two nylon cords 6 defining a cutting element, and a transmission mechanism 8 transmitting rotations of the internal combustion engine 2 to the nylon cords 6. A length of the nylon cord 6 is adjustable. The transmission mechanism 8 includes a centrifugal clutch 8a coupled to the internal combustion engine 2, and a transmission shaft 8b coupled to the centrifugal clutch 8a which is configured to connect the internal combustion engine 2 with the transmission shaft 8b, only when the internal combustion engine 2 operates at a rotational speed equal to or more than a clutch-in rotational speed which is higher than an idling rotational speed by a predetermined amount.

Figure 2:
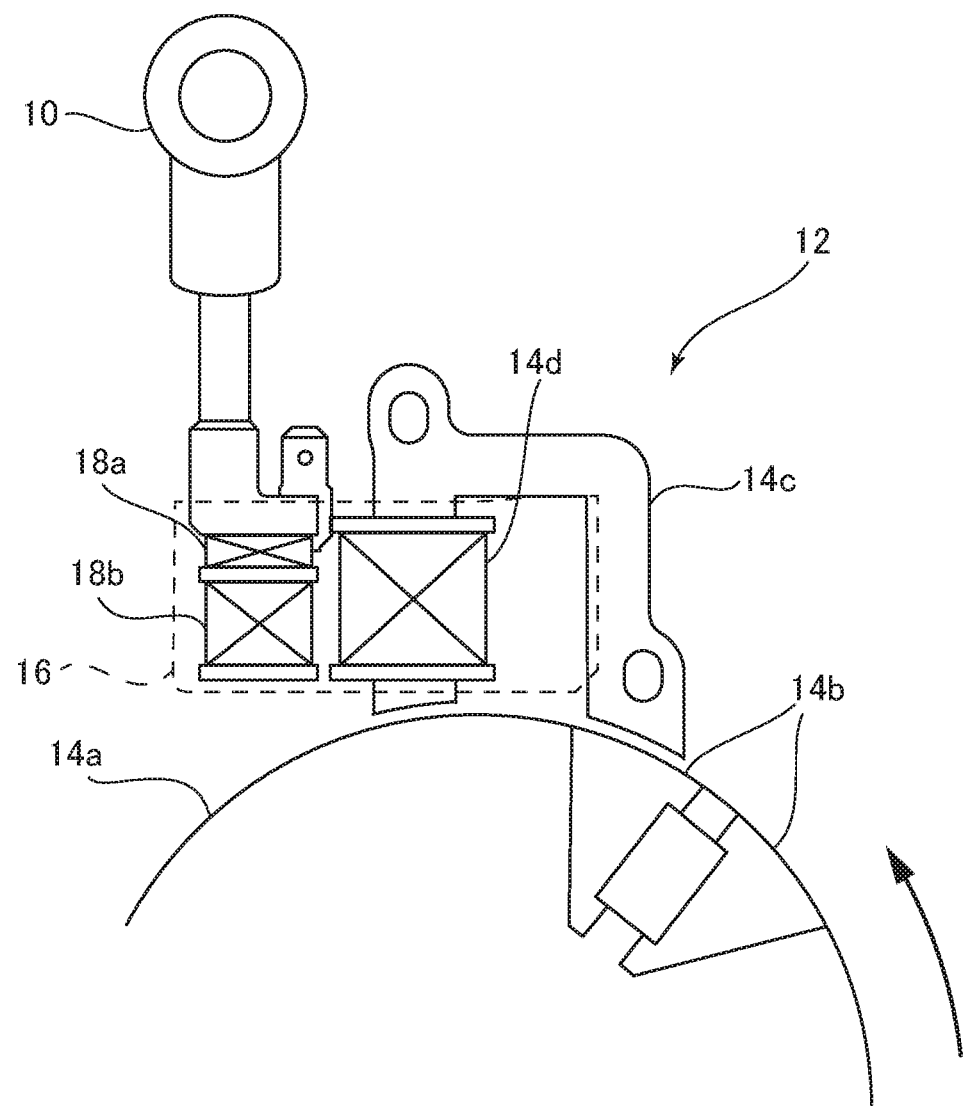
FIG. 2 is a schematic view of a control device in the brush cutter according to the present invention.

As shown in FIG. 2, the control device 12 includes a pair of magnets 14b disposed on an outer periphery of a flywheel 14a attached to a crankshaft (not shown), a U-shaped iron core 14c disposed next to the outer periphery of the flywheel 14a, and an input coil 14d wound around the iron core 14c. Further, the control device 12 has a control circuit 16 connected to the input coil 14d, a primary coil 18a connected to the control circuit 16, and a secondary coil 18b connected to the ignition plug 10. The control circuit 16 includes a processor (not shown), which is configured to detect a rotational speed every at least one rotation of the internal combustion engine 2.

Further, the control device 12 is configured to detect an amount of change in the rotational speed every at least one rotation of the internal combustion engine. The amount of change in the rotational speed is, for example, a rate of rotational speed variation (variation factor). Concretely, the rate of rotational speed variation can be calculated by using the following formula; (standard deviation of S)/(average of S)*100, wherein S indicates a rotational speed at each rotation during a predetermined number of successive rotations. Another example of the amount of change in the rotational speed is a maximum value of a difference between the rotational speeds at two successive rotations during a predetermined number of successive rotations. Another example of the amount of change in the rotational speed is a difference between a maximum value and a minimum value of the rotational speed at every rotation during a predetermined number of successive rotations. Another example of the amount of change in the rotational speed is an accumulated amount of differences between the rotational speeds at two successive rotations during a predetermined number of successive rotations.

Further, the control device 12 can set an ignition timing of the ignition plug 10 relative to the top dead center of the piston. In the present description, the ignition timing is indicated by a BTDC angle (an angle of a crankshaft before the top dead center).

Figure 3:
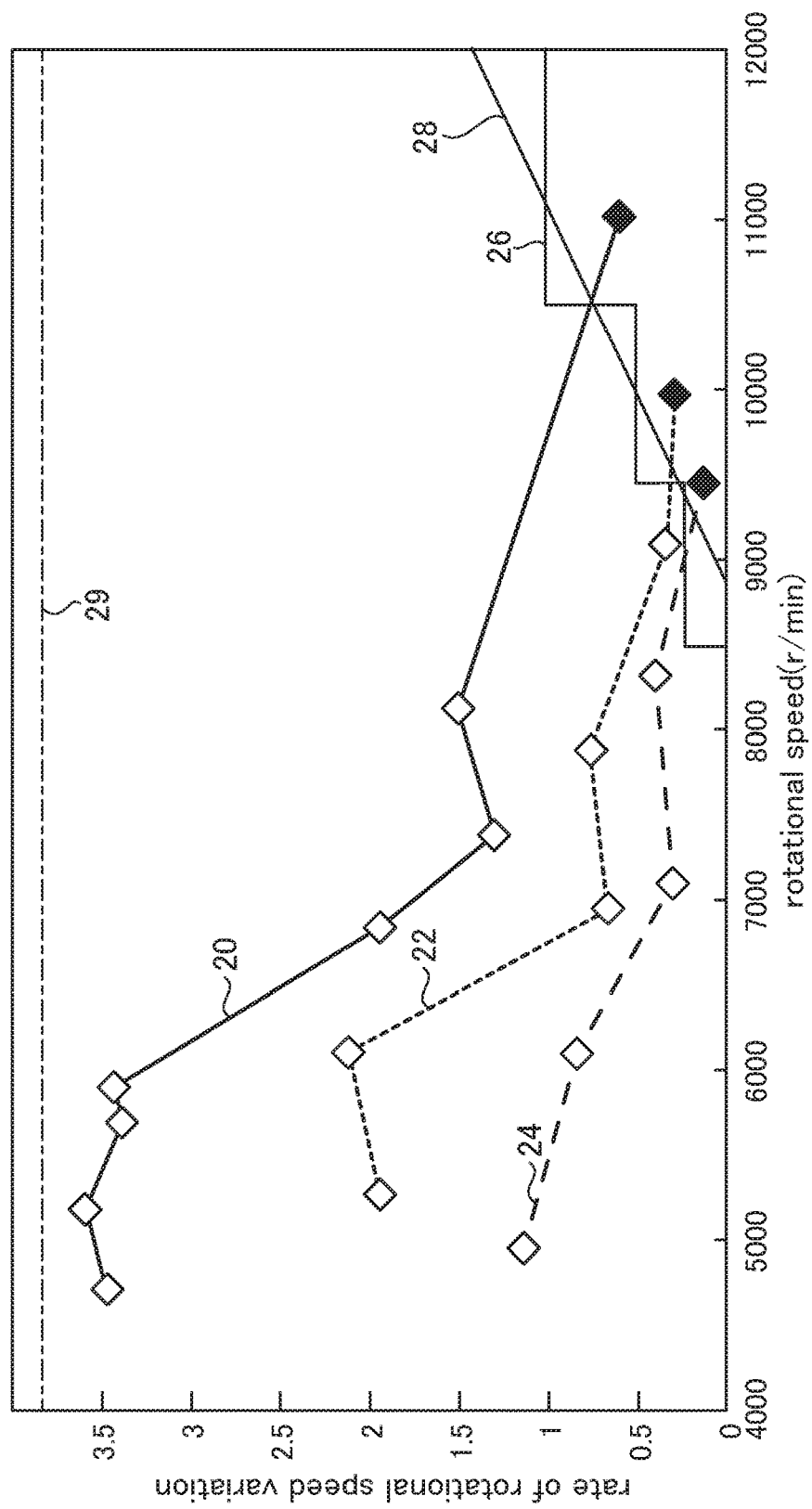
FIG. 3 is a graph showing the relationship between a rotational speed and a rate of rotational speed variation in the brush cutter according to the present invention.

FIG. 3 is a graph showing changes in the rate of rotational speed variation when the rotational speed of the internal combustion engine 2 is changed. In FIG. 3, a line 20 indicates a case when the cutter element is a disc blade, a line 22 indicates a case when the cutter element is a shorter nylon cord 6, and a line 24 indicates a case when the cutter element is a longer nylon cord 6. As shown by black points at respective right ends of the lines 20, 22, 24, when the throttle valve 2a is fully opened, the rotational speed becomes lower in an order of the lines 20, 22, 24. Further, the present inventor has found a tendency in each of the lines 20, 22, 24 that as the opening degree of the throttle valve 2a becomes smaller from the fully-opened state (or the rotational speed becomes lower), the rate of rotational speed variation becomes larger.

Figure 4:
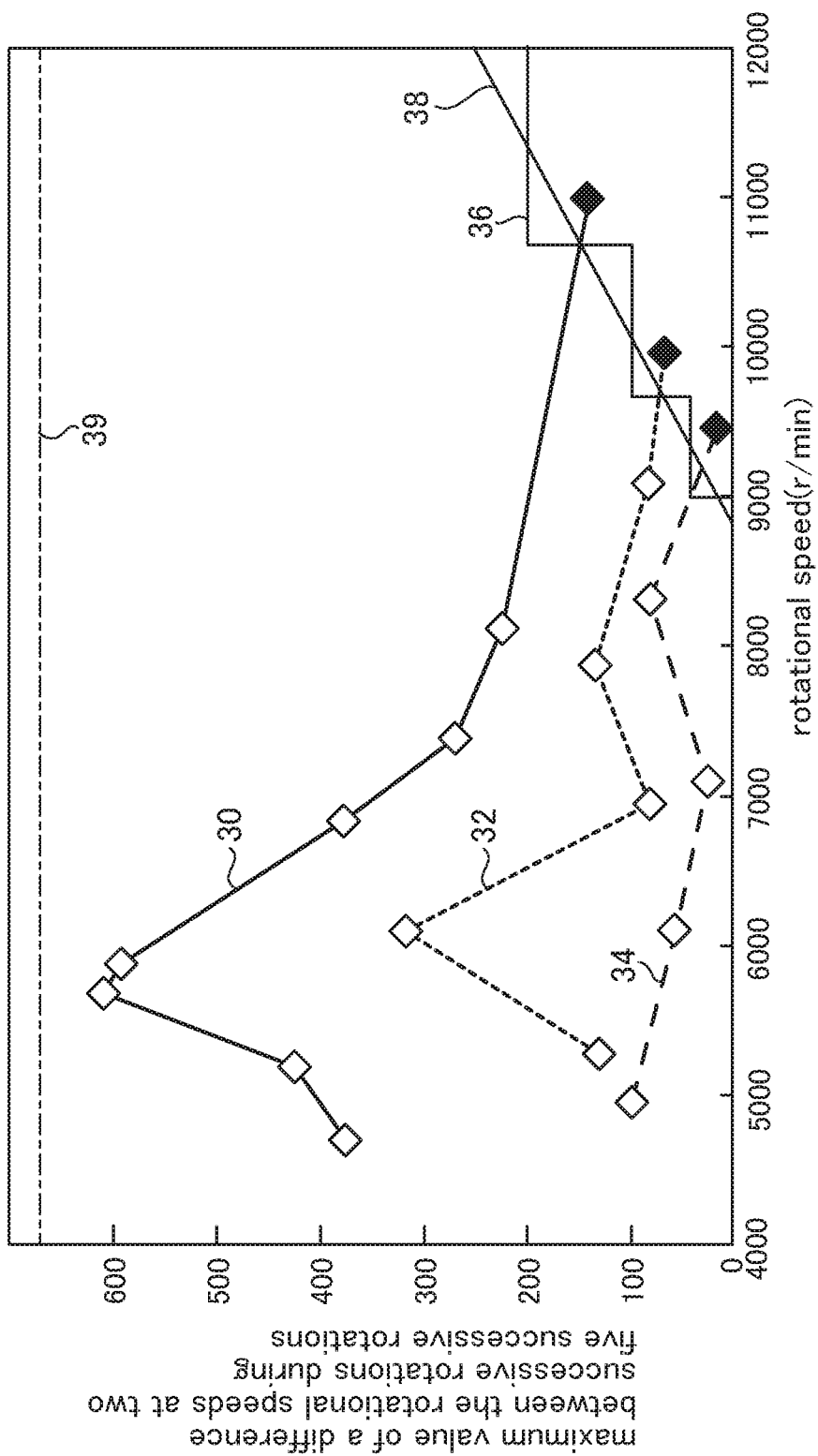
FIG. 4 is a graph showing the relationship between the rotational speed and the maximum value of differences of the rotational speeds during five successive rotations in the brush cutter according to the present invention.

FIG. 4 is a graph showing changes in the maximum value of the difference between the rotational speeds at two successive rotations during five successive rotations when the rotational speed of the internal combustion engine 2 is changed, which data are obtained by the present inventor through experiments. In FIG. 4, a line 30 indicates a case when the cutting element is a disc blade, a line 32 indicates a case when the cutter element is the shorter nylon cord 6, and a line 34 indicates a case when the cutter element is the longer nylon cord 6. As shown by black points at respective right ends of the lines 30, 32, 34, when the throttle valve 2a is fully opened, the rotational speed becomes lower in an order of the lines 30, 32, 34. Further, the present inventor has found a tendency in each of the lines 30, 32, 34 that as the opening degree of the throttle valve 2a becomes smaller from the fully-opened state (or the rotational speed becomes lower), the above-stated maximum value of the difference between the rotational speeds becomes larger.

The present inventor has also found a tendency similar to those shown in FIGS. 3 and 4 in the difference between the maximum value and the minimum value of the rotational speeds during a predetermined number of successive rotations when the rotational speed of the internal combustion engine 2 is changed. The present inventor has also found a tendency similar to those shown in FIGS. 3 and 4 in the accumulated amount of the differences between the rotational speeds at two successive rotations during a predetermined number of successive rotations, when the rotational speed of the internal combustion engine 2 is changed.

When the amount of change in the rotational speed is smaller than a predetermined value, the processor in the control device 12 determines that the throttle valve 2a is fully opened. The predetermined value is, for example, a value defined by a line 26 or 36. The line 26 or 36 defines respective different values in different rotational speed zones (for example, 8500-9500 rpm, 9500-10500 rpm, and equal to or more than 10500 rpm). Alternatively, the above-stated predetermined value is a value defined by a line 28 or 38. The line 28 or 38 increases monotonically, as the rotational speed becomes higher. The line 28, 38 may be a straight line or a curved line.

The above-stated amount of change in the rotational speed was measured when the rotational speed of the internal combustion engine 2 is in a steady state. When the internal combustion engine 2 is in an acceleration state or in a deceleration state due to changes in the opened degree of the throttle valve 2a, the amount of change in the rotational speed is larger than a threshold value for determination of the acceleration and deceleration states, the threshold value being shown by lines 29, 39.

Next, an operation of the brush cutter according to the present invention will be explained.

The processor in the control device 12 is configured to detect a rotational speed every one rotation of the internal combustion engine 2 based on a current of the input coil 14d which is induced by the pair of magnets 14b. Further, the processor in the control device 12 is configured to calculate the above-stated amount of change in the rotational speed every one rotation of the internal combustion engine 2.

Figure 5:
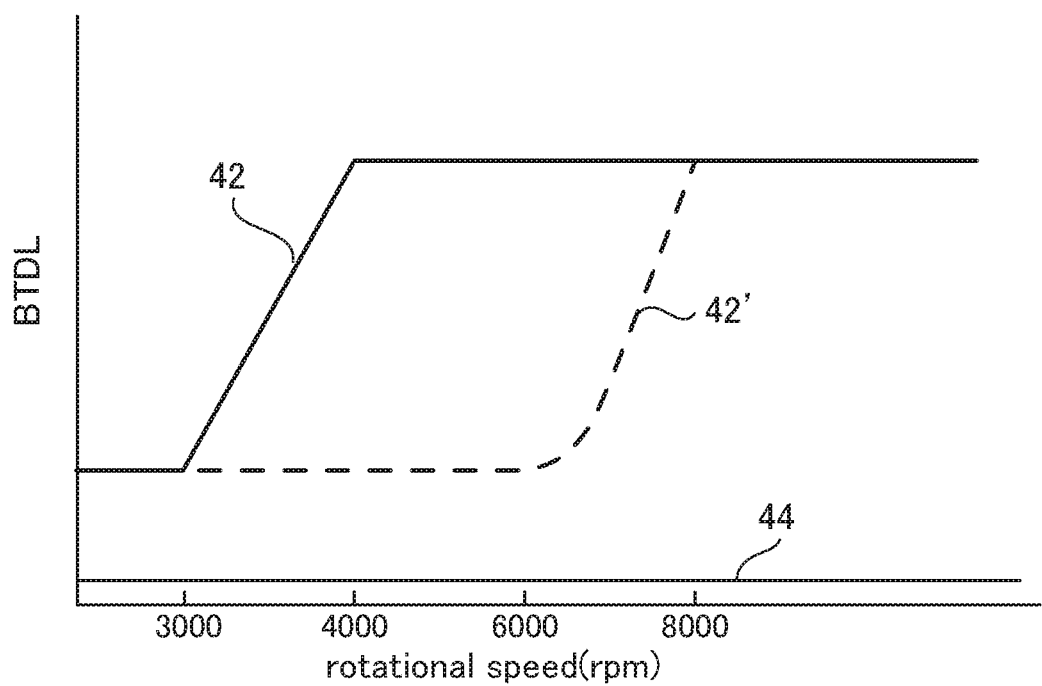
FIG. 5 is a graph showing an example of a normal ignition timing.

Further, the processor in the control device 12 is configured to activate the ignition plug 10 at a normal ignition timing represented by a line 42 in FIG. 5. The normal ignition timing is an ignition timing with a small amount of the advanced angle during a relatively low rotational speed (about 10 degrees) and with a large amount of the advanced angle during a relatively high rotational speed (about 20-25 degrees).

According to a flowchart shown in FIG. 6, in S1, whether or not the rotational speed of the internal combustion engine 2 is larger than a control rotational speed is determined, wherein the control rotational speed is obtained by adding a predetermined amount of rotational speed to the clutch-in rotational speed.

When the determination in S1 is NO, the rotational speed of the internal combustion engine 2 is near an idling rotational speed which does not cause any uncomfortable vibrations, so that the internal combustion engine 2 is operated at the normal ignition timing, as shown in S7.

When the determination in S1 is YES, in S2, whether or not an acceleration or deceleration is performed is determined. Whether or not the acceleration or deceleration is performed can be determined, for example, according to whether or not the amount of change in the rotational speed is larger than the threshold value for determination of the acceleration and deceleration states. Alternatively, it is determined that the deceleration is performed, when the rotational speed becomes lower than a predetermined threshold value, when an average of the rotational speeds during n (number) successive rotations is decreased by a predetermined amount of the rotational speed from the previous average, or when the rotational speeds during n (number) successive rotations are decreased by a predetermined amount of the rotational speed. Further, it is determined that the acceleration is performed, when an average of the rotational speeds during n (number) successive rotations is increased by a predetermined amount of the rotational speed from the previous average, or when the rotational speeds during n (number) successive rotations are increased by a predetermined amount of the rotational speed.

When the determination in S2 is YES, the internal combustion engine 2 is in the acceleration or deceleration state, so that the internal combustion engine 2 is operated at the normal ignition timing, as shown in S7.

The determination in S2 is NO, the rotational speed of the internal combustion engine 2 is in the steady state, so that in S3, whether the throttle valve 2a is partially or fully opened is determined. Concretely, whether or not the amount of change in the rotational speed is equal to or larger than a threshold value for determination of a fully-opened state is determined.

When the determination in S3 is NO, the throttle valve 2a is in the fully-opened state, so that the internal combustion engine 2 is operated at the normal ignition timing, as shown in S8.

When the determination in S3 is YES, the throttle valve 2a is in the partial-opened state, so that in S4, the internal combustion engine 2 is operated at a retarded ignition timing (lines 44 in FIG. 5), which is later than the normal ignition timing.

Then, in S5 and S9, whether or not the acceleration or deceleration is performed is determined in a way similar to that in S2.

When the determination in S9 is NO, the internal combustion engine 2 is neither in the acceleration state nor in the deceleration state so that the internal combustion engine 2 is still operated at the normal ignition timing. When the determination in S9 is YES, the internal combustion engine 2 is in the acceleration state or in the deceleration state so that the control is finished (namely, the internal combustion engine 2 is still operated at the normal ignition timing). The control may not be finished to return to S1.

When the determination in S5 is NO, the internal combustion engine 2 is neither in the acceleration state nor in the deceleration state so that the internal combustion engine 2 is still operated at the retarded ignition timing. When the determination in S5 is YES, the internal combustion engine 2 is in the acceleration state or in a deceleration state so that in S6, the internal combustion engine 2 is operated at the normal ignition timing and the control is finished (namely, the internal combustion engine 2 is still operated at the normal ignition timing). The control may not be finished to return to S1.

In S3, whether the throttle valve 2a is partially or fully opened can be determined without adding any sensors and so on directly detecting the opened degree of the throttle valve 2a, so that an operating state of the brush cutter 1 can be appropriately obtained.

In S8, it is assumed that the throttle valve 2a is in the fully-opened state to perform a bush-cutting work and so on. Thus, in S9, it is preferable the ignition plug 10 is activated at the normal ignition timing which is appropriate for the bush-cutting work as long as a clear acceleration or deceleration is not detected.

Further, in the above-stated control, the internal combustion engine 2 is operated at the normal ignition timing in the acceleration state of the brush cutter 1 before or during working and when the throttle valve 2a is determined to be fully-opened in S3 (during fully-opened high-speed operation), so that a feeling of an operator becomes good at the acceleration and at the high speed. Further, when the throttle valve 2a is determined to be partially opened in S3, the internal combustion engine 2 is operated at the retarded ignition timing to reduce the rotational variation and the accompanying uncomfortable vibration due to the combustion variation of the internal combustion engine 2.

In the conventional brush cutter, the internal combustion engine is controlled only at the normal ignition timing, and regarding the conventional normal ignition timing, a rotational speed which switches the ignition timing from that with the small amount of the advances angle to that with the large amount of the advanced angle is relatively high (see line 42' in FIG. 5). This is because an anti-vibration feeling can be ensured in an intermediate rotational speed zone (for example, 4000-6000 rpm) by giving priority on the reduction of the vibration rather than the acceleration performance.

In contrast, in the present embodiment, the rotational speed which switches the ignition timing from that with the small amount of advance angle to that with the large amount of the advanced angle can be relatively low (for example, 3000-4000 rpm) so that in the intermediate rotational speed zone, not only the good acceleration feeling but also the good anti-vibration feeling can be achieved.

Although an embodiment of the present invention has been explained, the present invention is not limited to the embodiment, namely, many kinds of modifications can be done within the scope of the present invention, and it goes without saying that such modifications fall within the scope of the present invention.

In the above-stated embodiment, the brush cutter has been explained, but the handheld engine-driven working machine according to the present invention may be another engine-driven working machine, such as a chain saw, a hedge trimmer, a power blower (a fan) and so on.

What is claimed:

1. A handheld engine-driven working machine comprising:
   an internal combustion engine with a throttle valve;
   a centrifugal clutch coupled to the internal combustion engine and operating at a rotational speed equal to or greater than a clutch-in rotational speed;
   a throttle adjusting device for adjusting an opening degree of the throttle valve of the internal combustion engine; and
   a control device provided in the internal combustion engine;
   wherein at the rotational speed higher than the clutch-in rotational speed the control device is configured to detect a rotational speed and an amount of change in the rotational speed at at least once in each rotation of the internal combustion engine, and determines that the throttle valve is partially opened when the amount of change in the rotational speed is greater than a predetermined value which is defined to change according to a change in the rotational speed.

2. The handheld engine-driven working machine according to claim 1, wherein the amount of change in the rotational speed is a rate of rotational speed variation, a maximum value of a difference between the rotational speeds at two successive rotations during a predetermined number of successive rotations, a difference between a maximum value and a minimum value of the rotational speed at every rotation during a predetermined number of successive rotations, or an accumulated amount of differences between the rotational speeds at two successive rotations during a predetermined number of successive rotations.

3. The handheld engine-driven working machine according to claim 1, wherein the predetermined value is different depending on a rotational speed zone.

4. The handheld engine-driven working machine according to claim 1, wherein the predetermined value becomes larger as the rotational speed becomes larger.

5. The handheld engine-driven working machine according to claim 1, wherein the control device retards an ignition timing of the internal combustion engine after it determines that the throttle valve is partially opened.

* * * * *